United States Patent [19]
Rastogi

[11] 3,827,599
[45] Aug. 6, 1974

[54] PLURAL CONTAINER PRESSURE DIFFERENTIAL SYSTEM
[75] Inventor: Vijay Rastogi, Troy, Ohio
[73] Assignee: The B. F. Goodrich Company, New York, N.Y.
[22] Filed: June 21, 1972
[21] Appl. No.: 264,841

[52] U.S. Cl................. 222/52, 222/95, 222/386.5
[51] Int. Cl............................................. B65d 5/54
[58] Field of Search............ 222/52, 53, 61, 94, 95, 222/96, 396, 397, 386.5; 60/39.09, 39.48; 244/16 C; 102/105; 184/39, 45

[56] References Cited
UNITED STATES PATENTS
| | | | |
|---|---|---|---|
| 2,852,098 | 9/1958 | Beason | 184/39 |
| 3,491,539 | 1/1970 | Mangum | 60/39.48 X |
| 3,504,827 | 4/1970 | Larson | 222/541 X |
| 3,515,308 | 6/1970 | Hayes et al. | 220/89 A |

Primary Examiner—Stanley H. Tollberg
Assistant Examiner—L. Martin
Attorney, Agent, or Firm—Joseph Januszkiewicz

[57] ABSTRACT

A fluid pressure actuated system in which an inner contractile container is disposed within an outer container and has a spout extending outside the outer container with a pressure actuated closure in the spout for permitting the ejection of fluid from the inner container when the pressure differential between the inner and outer containers reaches a predetermined amount and the inner container is contracted. A valve in the wall of the outer container releases pressure from the outer container when the pressure inside the outer container exceeds the pressure outside by a predetermined amount which could occur when a space shuttle type vehicle leaves the earth's atmosphere and enters the vacuum of outer space. The system is thereafter triggered to react to an increase in outside pressure which occurs when the space shuttle type vehicle re-enters the atmosphere.

11 Claims, 3 Drawing Figures

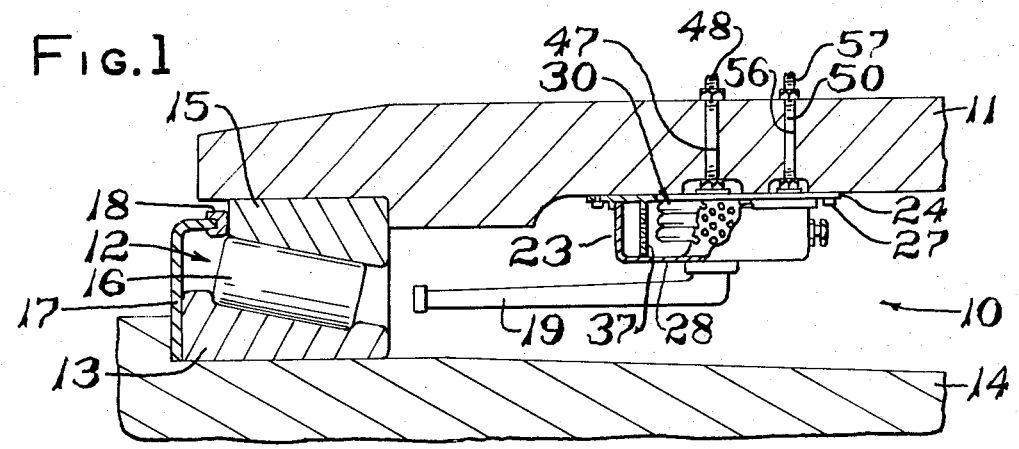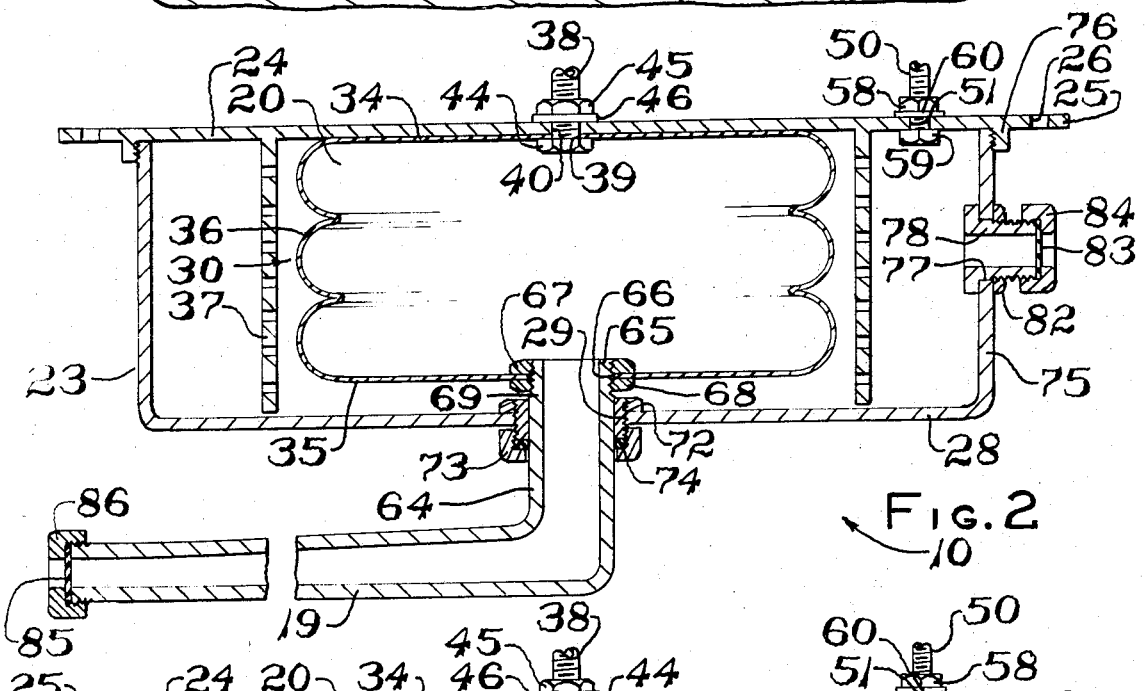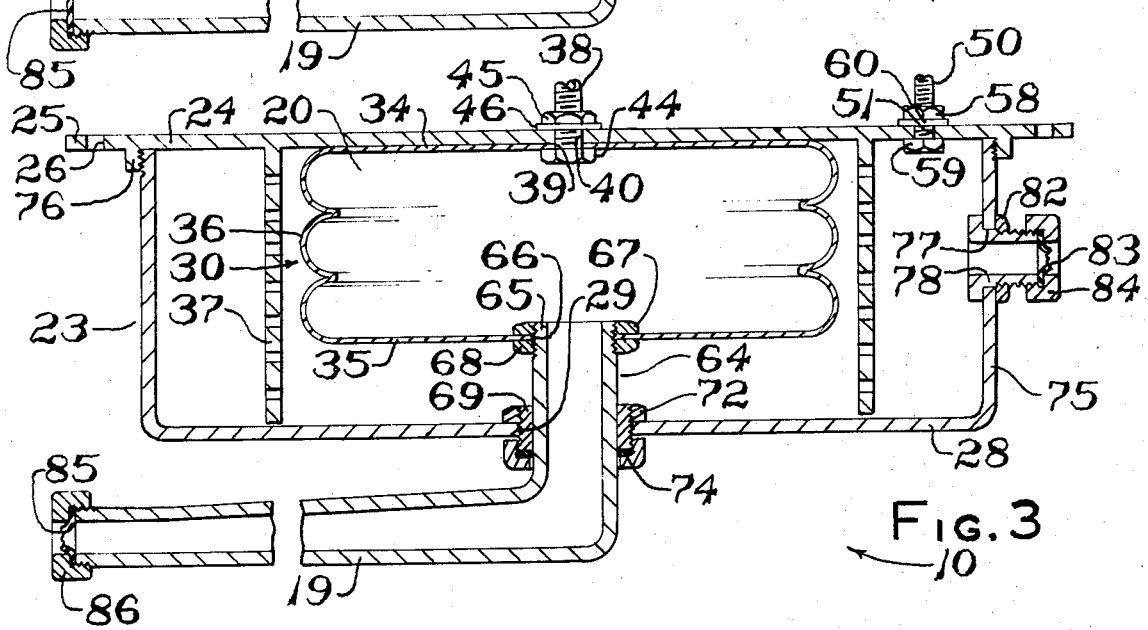

3,827,599

PLURAL CONTAINER PRESSURE DIFFERENTIAL SYSTEM

BACKGROUND OF THE INVENTION

This invention relates to a fluid pressure actuated system and particularly to an automatic lubrication system for lubricating bearings of a space shuttle type vehicle upon re-entry into the earth's atmosphere. A space shuttle type vehicle takes off at ground level temperatures and pressures and is flown into outer space where it operates at temperatures far below 0° F. and in a hard vacuum. This vehicle then re-enters the earth's atmosphere and is capable of flying to a landing area where the landing is made at ground level temperatures and pressures.

It has been found that bearing oils and greases can be retained in the hard vacuum and exceedingly cold temperatures only through extensive sealing methods involving expensive, highly sophisticated equipment and materials which require considerable space and undesirable weight additions to the vehicle. The maintenance and replacement costs are also high for sealing equipment of this type. The problems accompanying these sealing methods have created a need for alternatives which will provide the essential lubrication of the bearings on a space shuttle type vehicle.

SUMMARY OF THE INVENTION

According to this invention, sealing methods are not relied upon to retain oils and greases in the hard vacuum and cold temperatures of outer space. Instead, a fluid pressure system is provided which lubricates the bearings with fresh oil after the space shuttle type vehicle re-enters the atmosphere and before the bearings are used, as, for example, prior to wheel spinup on landing. The fluid pressure actuated system of this invention includes a bellows filled with lubricating oil and having a spout for ejecting oil from the bellows onto the bearings. The bellows is contained in an outer chamber which contains a slight vacuum but has a pressure greater than the pressure in the bellows prior to take-off. The spout of the bellows is closed by a closure which retains the oil in the bellows as long as the pressure differential between the pressure inside the bellows and outside the bellows does not exceed a predetermined amount. This is controlled prior to take-off by controlling the amount of vacuum in the outer container and the bellows. As the vehicle is flown out of the atmospheric pressure into space, a valve such as a membrane seal on the outer container blows out when the pressure differential within the container exceeds the pressure outside by a predetermined amount and this exposes the outside of the bellows to the atmospheric pressure upon re-entry into the earth's atmosphere. Then upon descent into the earth's atmosphere, the atmospheric pressure will increase and when it reaches a point where the pressure differential between the pressure within the bellows and outside the bellows reaches a predetermined amount, the bellows will be contracted, the closure in the spout will be opened and oil will be ejected onto the bearing providing the necessary lubrication to the bearing.

Prior to taking off for another trip into outer space, the bellows can be refilled with oil and the diaphragm closures on the spout and outer wall of the outer container can be replaced. The proper amount of vacuum can then be applied to the space within the bellows and within the outer container. This is a relatively simple procedure and has many advantages over sealing methods where the seals must either be replaced or tested extensively to be sure they will function properly.

The accompanying drawings show one preferred form made in accordance with and embodying this invention and which is representative of how this invention may be practiced.

BRIEF DESCRIPTION OF THE DRAWINGS

In the drawings:

FIG. 1 is a fragmentary cross sectional view of a space shuttle type vehicle wheel bearing showing a portion of a the wheel hub and axle with the fluid actuated lubricating system of the invention mounted on the wheel hub with certain parts being broken away to show the construction of the system.

FIG. 2 is an enlarged sectional view of the lubrication system of the invention shown in the closed condition prior to take-off of the space shuttle type vehicle.

FIG. 3 is a sectional view like FIG. 2 showing the lubrication system in the open condition where the bellows is compressed and the oil is being ejected onto the bearings after the vehicle re-enters the atmosphere.

DETAILED DESCRIPTION

Referring to FIG. 1, a fluid pressure actuated system such as automatic wheel bearing lubrication system 10 is shown mounted on a wheel hub 11 of a space shuttle type vehicle for lubricating a bearing 12. An inner race 13 of the bearing 12 is mounted on an axle 14 of the space shuttle type vehicle with an outer race 15 mounted on wheel hub 11 and a roller 16 between the inner race 13 and outer race 15. An annular outer seal 17 is mounted between the inner race 13 and axle 14 and may be of metal such as steel with a bead 18 of soft metal extending into engagement with the edge of the outer race 15.

The oil ejection means for the lubrication system 10 includes a tubular spout 19 extending to a position between the inner race 13 and outer race 15 for ejecting a fluid lubricant such as oil 20 into the bearing 12.

As shown in FIG. 1 and in greater detail in FIG. 2, the lubrication system 10 has an outer container such as cylindrical outer chamber 23 with a supporting wall 24 having a surface adjacent the surface of the wheel hub 11 and a flange 25 containing holes 26 through which screws 27 may be inserted and threaded into the wheel hub for fastening the outer chamber to the wheel hub. The outer chamber 23 has an opposing wall 28 with an aperture 29 through which the tubular spout 19 extends for attachment to a contractile inner container such as metal bellows 30. The bellows 30 has a fixed end wall 34 which may be mounted on the supporting wall 24 of the outer chamber 23 and a movable end wall 35 to which the tubular spout 19 is fastened. The bellows 30 also has sidewalls 36 which may be of a flexible resilient material such as a thin metal and have a grooved configuration to permit movement of the movable end wall 35 from the extended position shown in FIG. 2 to a contracted position as shown in FIG. 3.

A perforated cylindrical shield 37 may be located in a position around the sidewalls 36 of the bellows 30 and extend between the supporting wall 24 and opposing wall 28 of the outer chamber 23 for supporting the sidewalls of the bellows when the pressure differential between the pressure inside and outside the bellows is substantial.

Means for injecting oil 20 into the bellows 30 may include a tube 38 extending through aligned openings 39 and 40 in the bellows 30 and outer chamber 23, respectively. The end of the tube 38 may be threaded with nuts 44 and 45 clamping the supporting wall 24, fixed end wall 34 and a sealing washer 46 together. The tube 38 extends through a passage 47 in the wheel hub 11 and has a threaded nipple 48 extending through the wall of the wheel hub 11 for connecting the space inside the bellows 30 to a source of oil 20 and also to a means for applying a slight vacuum to the bellows (not shown). A similar connection to the space within the outer chamber 23 is provided by a tube 50 extending through an opening 51 in the outer chamber 23 and then through a passage 56 in the wall of the wheel hub 11. The tube 50 has a nipple 57 extending outwardly from the wall of the wheel hub 11 which may be threaded to receive a connection to a source of vacuum (not shown) for applying a vacuum to the outer chamber 23. The inner end of the tube 50 is also threaded for receiving nuts 58 and 59 for clamping a sealing washer 60 and supporting wall 24 of outer chamber 23 together in sealing engagement.

The tubular spout 19 has a straight cylindrical section 64 extending upwardly through the aperture 29 in the opposing wall 28 of the outer chamber 23 with a threaded end 65 of the cylindrical section extending through an opening 66 in the movable end wall 35 of the bellows 30 and being clamped thereto by nuts 67 and 68 on the inside and outside of the wall. The cylindrical section 64 has a smooth surface which is in sliding engagement with a sleeve 69 extending through the aperture 29 in the opposing wall 28 of the outer chamber 23. The sleeve 69 is held in position by a nut 72 threaded on the outer surface of the sleeve on the inside of the outer chamber 23 and a flanged collar 73 threaded on the outer surface of sleeve 69 and located outside the chamber. A sealing member such as O-ring 74 may be disposed between the flange of the collar 73 and the end of the sleeve 69 to provide a seal against the outer surface of cylindrical section 64.

The outer chamber 23 has a cylindrical sidewall 75 which may be in threaded engagement with a collar 76 of the supporting wall 24 for easy access to the bellows 30 within the outer chamber. An opening 77 is provided in the cylindrical sidewall 75 for receiving a bushing 78 held in place by a nut 82 and supporting a valve which in this case may be a diaphragm 83 clamped over the end of the bushing as by a collar 84. The diaphragm 83 is calibrated to withstand a predetermined differential in pressure between the inside and outside of the outer chamber 23 and preferably for this embodiment of the invention, the diaphragm will blow when the differential in pressure exceeds 5 psi.

As shown in FIGS. 2 and 3, a closure such as diaphragm 85 is mounted on the end of the tubular spout 19 adjacent the bearings 12 as by a collar 86 threaded on the end of the tubular spout. This diaphragm 85 is calibrated to retain the oil 20 within the bellows 30 until the pressure within the outer chamber 23 is 3 psi greater than the pressure within the bellows at which time the bellows will contract with the movable end wall 35 moving upward from a position as shown in FIG. 2 to a position as shown in FIG. 3 causing the diaphragm to blow and the oil to be ejected into the bearing 12.

In the operation of the lubricating system 10, the diaphragm 83 and diaphragm 85 are installed in the bushing 78 of the outer chamber 23 and on the end of the tubular spout 19. A slight vacuum of approximately 10 psi is applied to the space within the outer chamber 23 through the tube 50 which is then sealed. Oil 20 is pumped into the bellows 30 at a pressure of approximately 9 psi through the tube 38 which is then sealed. This may extend the movable end wall 35 of the bellows 30 to a position as shown in FIG. 2.

When the space shuttle type vehicle takes off and reaches an altitude where the difference in pressure between the pressure in the outer chamber 23 and the outside pressure exceeds 5 psi the diaphragm 83 will blow and the pressure in the outer chamber 23 will be the same as the pressure outside the outer chamber.

After the space shuttle type vehicle re-enters the atmosphere, the atmospheric pressure and therefore the pressure in the outer chamber 23 will increase. When the pressure differential between the pressure within the bellows 30 and the pressure outside the bellows or atmospheric pressure reaches a point where the outside pressure is 3 psi greater than the pressure in the bellows, the diaphragm 85 will blow and the movable wall 35 of the bellows 30 will move upward to a position shown in FIG. 3 causing the oil 20 to spray on the bearing 12 as shown in FIG. 3.

When the space shuttle vehicle is operating in space, the temperatures are far below 0° F. and there is a hard vacuum which causes the lubricant on the bearing 12 to be dissipated. This vacuum also may exert an expanding force on the sidewalls 36 of the bellows 30; however, the perforated shield 37 surrounding the sidewalls will prevent undue expansion of the bellows and prevent rupture thereof.

This invention has been applied to a lubricating system for a space shuttle type vehicle; however, it is evident that the invention may be applied to other fluid actuated mechanisms in connection with space shuttle type vehicles. The fluid may be oil or other fluid mediums. For example, mercury could be ejected to close electrical contacts in the space shuttle type vehicle upon re-entry into the earth's atmosphere.

The materials used for the lubrication system described heretofore are those preferred for this construction; however, it is understood that other materials having similar properties may be used. For example, the bellows 30 may be of another flexible resilient material such as rubber or other rubberlike material and still provide a construction made in accordance with the invention.

I claim:

1. A fluid pressure actuated system comprising a first container, a second container, a movable wall separating space within said first container from space within said second container, means for reducing the pressure in said space within said second container, means for injecting fluid into said first container and a closure in said first container for releasing fluid from said first container at a predetermined pressure differential between said first container and said second container whereby fluid is ejected from said first container by movement of said movable wall when said pressure differential is exceeded.

2. A fluid pressure actuated system according to claim 1 wherein said system includes means for varying the pressure in said second container in response to changes in pressure outside said second container.

3. A fluid pressure actuated system according to claim 2 wherein said means for varying the pressure in said second container comprises a valve which is opened when the pressure inside exceeds the pressure outside said second container by a predetermined amount.

4. A fluid pressure actuated system according to claim 1 wherein said closure further comprises a diaphragm member having a predetermined bursting strength whereby said diaphragm will break when said predetermined pressure differential between said first container and said second container is reached.

5. A fluid pressure actuated system according to claim 1 wherein said first container further comprises a contractile inner container within said second container and ejection means mounted on said movable wall for connecting said closure in said first container with the space outside said second container.

6. A fluid pressure actuated system according to claim 5 wherein said second container has a wall enclosing said first container and said space within said second container, said ejection means further comprising a tubular spout on said movable wall leading from said inner container through the wall of said second container to the space outside said second container.

7. A fluid pressure actuated system according to claim 6 wherein said contractile inner container further comprises a metal bellows having end walls including said movable wall and a fixed end wall mounted on the wall of said second container.

8. A fluid pressure actuated system according to claim 7 wherein said means for injecting pressure fluid into said first container includes aligned openings in said fixed end wall of said bellows and in the wall of said second container.

9. A fluid pressure actuated system according to claim 7 wherein said tubular spout extends in slidable sealing engagement through an opening in the wall of said second container, said closure being disposed in said spout for opening at said predetermined pressure differential for ejecting fluid from said bellows through said spout.

10. A fluid pressure actuated system according to claim 9 including a valve in the wall of said second container, said valve being opened by fluid pressure in said second container when the pressure inside exceeds the pressure outside said second container by a predetermined amount.

11. A fluid pressure actuated system according to claim 5 wherein said contractile inner container is surrounded by a shield member for controlling the expansion of the walls of said inner container.

* * * * *